3,549,719
**PROCESS FOR THE PURIFICATION
OF OLEFINES**
Coenraad J. Duyverman, Sittard, Netherlands, and Peter
Rademakers, Susterseel, Germany, assignors to Stamicarbon N.V., Heerlen, Netherlands
Filed June 13, 1969, Ser. No. 833,091
Claims priority, application Netherlands, June 17, 1968,
6808517
Int. Cl. C07c 11/02, 11/06
U.S. Cl. 260—677   6 Claims

ABSTRACT OF THE DISCLOSURE

The present invention relates to a process for the removal of contaminants from olefines, especially from ethylene and propylene, by passing said olefins, in the gaseous phase and at elevated temperature, over a mass containing cupric oxide (CuO) and capable of being regenerated by treating it with an oxygen-containing gas. In addition to cupric oxide, the said mass contains zinc oxide (ZnO); the CuO-content of the zinc oxide containing mass amounts to 20–60% by weight. The purification of the olefines is effected at a temperature of 50–200° C., at a pressure ranging from atmospheric to 50 bars. Oxygen-containing gas is containing a small amount of water in the vapour form.

---

Figure 1:
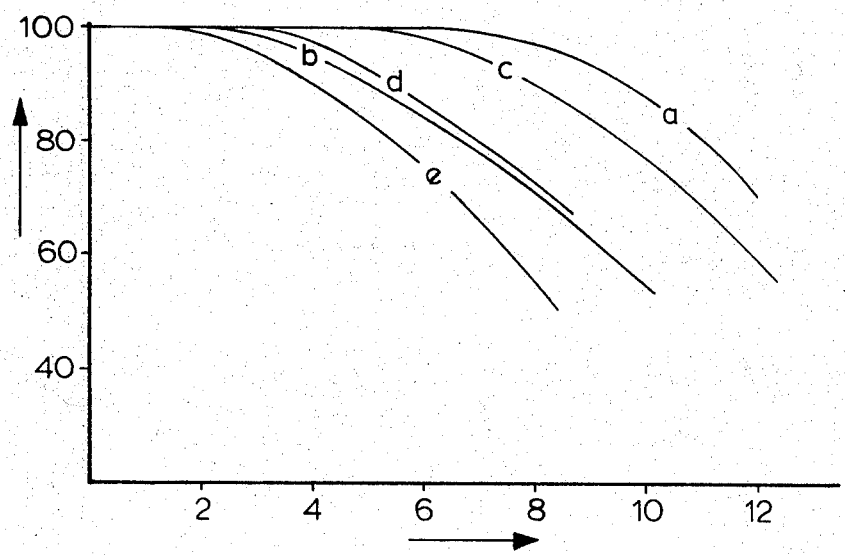

This invention relates to a process for the removal of contaminants from olefins, especially from ethylene and propylene, by passing said olefins, in the gaseous phase and at elevated temperature, over a mass containing cupric oxide (CuO), which mass can be regenerated by treating it with an oxygen-containing gas.

In a number of catalytic processes use must be made of ethylene or propylene with a very high degree of purity. In some cases, $O_2$, $H_2$, highly unsaturated hydrocarbons such as $C_2H_2$, and particularly CO, may not be present as contaminants in amounts of more than 1 p.p.m. (in this connection, the term "p.p.m." relates to the volume).

It is known that contaminants can be removed from ethylene or other olefines with the aid of a reactive oxidation mass consisting of very finely divided cupric oxide.

The following, and other, reactions may take place when an olefine containing the above mentioned contaminents is treated with a cupric oxide mass.

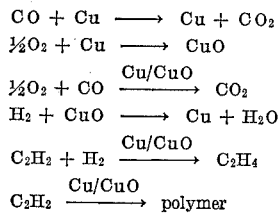

This means that it will be required eventually to remove traces of $CO_2$ and $H_2O$ from the effluent of the treated olefine, for which purpose, of course, special measurements have to be taken.

To prevent oxidation of ethylene, use must be made of a relatively low reaction temperature, e.g. of about 150° C. The reactivity required consequently calls for an extremely fine division of the cupric oxide. This can best be achieved by dispersing the cupric oxide in the presence of another inorganic material. The mass can be prepared both via the impregnation of the inorganic material with a cupric salt and via coprecipitation of a cupric salt and a salt of another metal from an aqueous solution.

The degree of oxygen exhaustion of the oxidation mass at a still admissible amount of carbon monoxide in the effluent is of vital importance in the process under consideration. After the conversion of carbon monoxide as a function of the reaction time has been virtually complete for a long time, it falls rather rapidly. As soon as the carbon monoxide content exceeds a predetermined limit, the oxidation mass must be regenerated. This can be done by passing an oxygen-containing gas, such as air, over the mass at a temperature of 150–300° C. However, the masses used thus far either had a activity or were active for a shorter period of time after being regenerated. This particularly applies to an oxidation mass consisting of CuO and Mg-silicate, MgO, $SiO_2$ or $Al_2O_3$, but also to a CuO-mass used without any accompanying material. In industrial applications, such masses must therefore be repeatedly replaced by fresh ones, which is of course expensive.

It has furthermore appeared that the number of materials that can be used together with the cupric oxide in the presence of ethylene is rather limited. A number of otherwise suitable materials, such as $MnO_2$ and $Cr_2O_3$, give rise to ethylene oxidation, which at elevated temperatures may even be explosive in nature. These substances are consequently unsuited for accompanying the CuO in the treatment of ethylene.

Surprisingly, it has now been found that olefines, in particular ethylene and propylene, can be virtually quantitatively freed of $CO_2$, $O_2$, $H_2$ and highly unsaturated hydrocarbons without any oxidation and/or polymerization of the olefines taking place, if the ethylene is, in the gaseous phase and at elevated temperature, passed over a mass containing cupric oxide, which mass can, after being used, almost completely be regenerated to its original activity by treating it with an oxygen-containing gas-provided that, according to the invention, the mass contains not only cupric oxide, but also zinc oxide (ZnO). The cupric oxide can be applied to the zinc oxide in a customary way, for example via impregnation with a cupric salt; in that case, the zinc oxide serves as the carrier material for the cupric oxide. It is also possible to obtain a mass consisting of cupric oxide and zinc oxide via coprecipitation from an aqueous solution of cupric salt and zinc salt.

The amount of CuO to be employed with respect to ZnO is determined on the one hand by economic factors: the presence of a small amount of CuO with respect to ZnO implies that a large amount of mass is required to ensure that there will be an acceptable interval between the regenerations. On the other hand, however, too large an amount of CuO with respect to ZnO will give rise to a decrease of the activity upon regeneration. By preference, use is therefore made of masses with a CuO-content of 20–60% by weight with respect to the ZnO. The process according to the invention can be advantageously carried out with the aid of known CuO-ZnO masses containing, e.g., 30% by weight of CuO.

The temperature range in which the purification of olefines with the aid of masses consisting of cupric oxide and zinc oxide can take place, is limited. At a temperature below 50° C., the activity of the mass is insufficient for effecting a satisfactory purification; above 200° C., a distinct oxidation of the olefins is to be expected. By preference, a temperature of 100–150° C. is employed. The use of the mass for the purification of olefines is not restricted to atmospheric pressure; any pressure ranging between the atmospheric pressure and 50 bars may be applied.

It has appeared that the mass, which, according to the invention, consists of CuO and ZnO, can be regenerated a virtually unlimited number of times without any noticeable loss of its activity. The regeneration can be advantageously carried out with the aid of an oxygen-containing gas which also contains a small amount, for example 0.05–1% by weight, of water in vapour form. Moist air, for example is eminently suited for this purpose.

The invention will be elucidated by means of the following examples.

EXAMPLE I

A flow of ethylene was continuously passed through a tubular reactor with an effective capacity of 20 ml., which was filled with a cupric oxide mass. The said mass consisted of a mixture of cupric oxide and magnesium silicate formed by coprecipitation of a cupric salt and an Mg-salt. The percentage of CuO contained in the mass amounted to 40% by weight.

The reaction temperature amounted to 125° C., while the reactor operated at atmospheric pressure. The gas load of the mass amounted to 110 litres of ethylene (S.T.P.) per kg. of mass per hour.

The following contaminants were contained in the ethylene feed:

Carbon monoxide—50 p.p.m.
Acetylene—25 p.p.m.
Hydrogen—10 p.p.m.

The amounts of the said substances contained in the effluent issuing from the reactor had decreased to:

Carbon monoxide—$\leqslant 0.2$ p.p.m.
Acetylene—$\leqslant 1$ p.p.m.
Hydrogen—$\leqslant 1$ p.p.m.

The effluent contained 50 p.p.m. of carbon dioxide. No oxidation and polymerization of ethylene took place.

The mass was regenerated when the above mentioned carbon monoxide limit value in the ethylene contained in the effluent was exceeded. After being flushed with nitrogen, the mass was regenerated at 175° C. with the aid of oxygen in the form of air.

No regeneration temperature was found at which the effectiveness of the used mass was completely regained. This is illustrated by means of FIG. 1. In this figure, the percentage of the fed-in carbon monoxide which was converted has been plotted on the vertical axis, the number of litres of carbon monoxide (S.T.P.) passed over the mass during the experiment per kg. of the said mass being plotted on the horizontal axis.

The letters to the curves shown in the figure relate to:

(a) a fresh mass consisting of cupric oxide and magnesium silicate;
(b) the same mass upon regeneration at 125° C.;
(c) the same mass upon regeneration at 175° C.;
(d) the same mass upon regeneration at 225° C.;
(e) the same mass upon regeneration at 250° C.

It will be seen that the effectiveness of the fresh mass is not regained anymore. If the regeneration is effected at low temperatures (<200° C.), the reoxidation is insufficient, while at higher temperatures the mass undergoes a change. The inadequacy of the regeneration was not caused by polymer deposition on the mass, for example owing to acetylene polymerization; also when carbon monoxide was the only contaminant contained in the ethylene, a completely identical pattern was obtained.

EXAMPLE II

Using a procedure identical with that described in Example I, a CuO-MgO mass containing 50% by weight of CuO was tested to determine its suitablity for being used in the purification of ethylene, which in this case was contaminated with 100 p.p.m. of carbon monoxide only. The reaction temperature amounted to 125° C., while the pressure was atmospheric and the gas load of the mass amounted to 1200 litres of ethylene (S.T.P.) per kg. of mass per hour. The CO was virtually completely removed to less than 0.2 p.p.m. No oxidation or polymerization of ethylene was observed. After the carbon monoxide content in the issuing gas flow had exceeded a given limit, the mass was regenerated at 200° C. in the way indicated in Example I. Upon said regeneration, the effectiveness appeared to amount to only one third of that of the fresh mass.

EXAMPLE III

Using a procedure identical with that described in Example I, a CuO-SiO$_2$ mass containing 40% by weight of CuO and also 3% by weight of Cr$_2$O$_3$ was tested as to its suitability for being used in the purification of ethylene, which in this case was contaminated with 250 p.p.m. of carbon monoxide. The reaction temperature amounted to 125° C., while the pressure was atmospheric and the gas load of the mass amounted to 820 litres of ethylene (S.T.P.) per kg. of mass per hour. After 10 litres of CO (S.T.P.) had been passed over per kg. of mass, it appeared that about 90% of the CO was still converted. However, 25 p.p.m. of ethylene were oxidized to CO$_2$ and H$_2$O.

EXAMPLE IV

Using a procedure identical with that described in Example I, a CuO-ZnO mass containing 30% by weight of CuO was tested as to its suitability for being used in the purification of ethylene. The reaction temperature amounted to 125° C., while the pressure was atmospheric and the gas load of the mass amounted to 780 litres of ethylene (S.T.P.) per kg. of mass per hour.

During this experiment, the reactor feed contained the following contaminants:

Carbon monoxide—varying between 25 and 450 p.p.m.
Acetylene—50 p.p.m.
Hydrogen—20 p.p.m.

The degree of carbon monoxide conversion invariably amounted to more than 99.5%, acetylene and hydrogen being removed to less than 1 p.p.m.

The said mass was used for 3½ months, during which period it was 14 times regenerated at a temperature of 175–200° C. with the aid of air containing 0.1% by volume of water, without any decrease of the effectiveness of the mass being observed. Neither was oxidation or polymerisation of ethylene noted.

EXAMPLE V

A tubular reactor filled with 20 ml. of a CuO-ZnO mass containing 30% by weight of CuO was, at a pressure of 16 atm. gauge, employed for purifying ethylene. The temperature at which the purification was effected amounted to 125° C., the gas load of the mass amounting to 1900 litres of ethylene (S.T.P.) per kg. of mass per hour. The ethylene contained the following contaminants:

Carbon monoxide—150 p.p.m.
Acetylene—50 p.p.m.
Hydrogen—25 p.p.m.
Oxygen—10 p.p.m.

The amount of the said substances contained in the effluent issuing from the reactor had decreased to:

Carbon monoxide—$\leqslant 1$ p.p.m.
Acetylene—$\leqslant 1$ p.p.m.
Hydrogen—$\leqslant 1$ p.p.m.
Oxygen—$\leqslant 1$ p.p.m.

Oxidation and polymerization of ethylene did not take place.

The mass was used for 3 months. During this period it was 8 times regenerated at a temperature of 180° C. with the aid of air containing 0.1% by volume of water, without any decrease of the effectiveness of the mass being observed.

Figure 2:
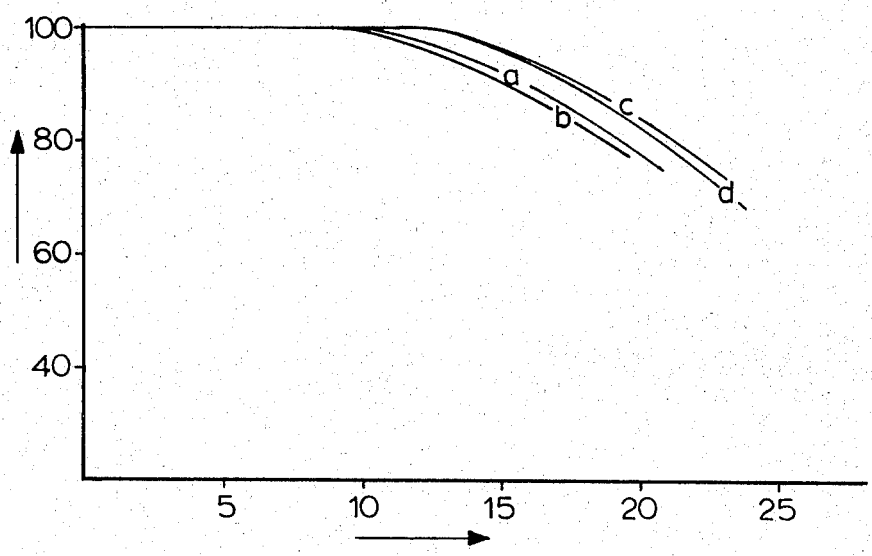

In FIG. 2, the effectiveness of the CuO-ZnO mass is graphically represented in the same way as in FIG. 1. The letters to the curves shown in the figure relate to:

(a) a fresh mass consisting of cupric oxide and zinc oxide;
(b) the same mass after the second regeneration;
(c) the same mass after the fourth regeneration;
(d) the same mass after the eighth regeneration.

EXAMPLE VI

Figure 3:
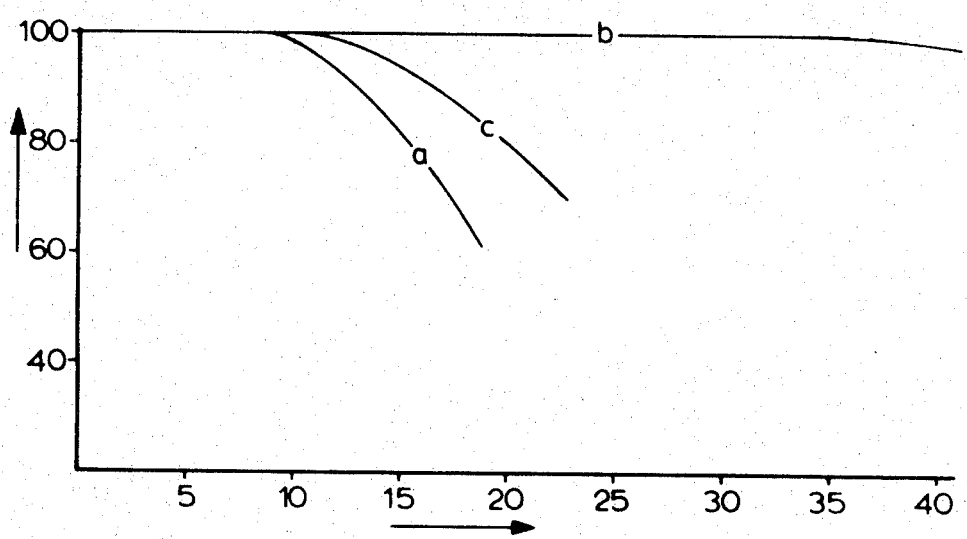

FIG. 3 shows a graphic comparison between the effectivity of the curic oxide mass used in Example V for the purification of ethylene at atmospheric pressure and at a pressure of 16 bars. The gas loads applied at 16 bars amounted to 750 and 1900 litres of ethylene (S.T.P.) per kg. of oxidation mass per hour. The gas load at atmospheric pressure amounted to 780 litres of ethylene (S.T.P.) per kg. of mass per hour. The ethylene was contaminated with 450 p.p.m. of carbon monoxide, 50 p.p.m. of acetylene, 120 p.p.m. of hydrogen and 10 p.p.m. of oxygen.

The percentage of the fed-in carbon monoxide which was converted has been plotted on the vertical axis, the number of litres of carbon monoxide passed over the mass during the experiment per kg. of the said mass being plotted on the horizontal axis. The letters to the curves shown in the figure refer to:

(a) atmospheric pressure and a gas load of 780 litres of ethylene per kg. of mass per hour;
(b) a pressure of 16 bars and a gas load of 750 litres of ethylene per kg. of mass per hour; and
(c) a pressure of 16 bars and a gas load of 1900 litres of ethylene per kg. of mass per hour.

The examples refer exclusively to the purification of ethylene. Identical results are obtained if the ethylene is replaced by another olefine in the gaseous phase, e.g. propylene. In addition to the aforementioned contaminants, other contaminants such as methanol can be removed.

EXAMPLE VII

A CuO-ZnO oxidation mass containing 30% by weight of CuO was tested as to its suitability for being used in the purification of ethylene containing acetylene as the chief contaminant.

Feed: ethylene containing 1000 p.p.m. of actylene (CO<10 p.p.m., $O_2$<2 p.p.m., $H_2$<2 p.p.m.).
Reaction temp.: 125° C.
Gas load: 780 litres of ethylene (S.T.P.) per kg. of mass per hour.
Pressure: 1 atm.
Composition of gas leaving the reactor; ethylene containing:
  <1 p.p.m. of acetylene.
  <1 p.p.m. of Co, $H_2$ and $O_2$.

After 30 litres of acetylene (S.T.P.) had been passed over per kg. of mass, acetylene broke through. By regeneration at 200° C. with the aid of air containing 0.1 vol.-percent of water the original activity and effectivity in respect of the removal of CO (see e.g. Example IV) was regained.

EXAMPLE VIII

A CuO-ZnO oxidation mass containing 30% by weight of CuO was tested as to its suitablity for being used for removing carbon monoxide and methanol from ethylene.

Feed: ethylene containing 50 p.p.m. of $CH_3OH$ and 50 p.p.m. of CO.
Reaction temperature: 125° C.
Gas load: 780 litres of ethylene (S.T.P.) per kg. of mass per hour.
Pressure: 1 atm.
In addition to ethylene, the effluent leaving the reactor contained:
  ≤0.2 p.p.m. of CO.
  <1 p.p.m. of $CH_3OH$.
  100 p.p.m. of $CO_2$.

Oxidation, dimerization and polymerization of ethylene are not observed.

What is claimed is:

1. Process for the removal of contaminants of the group consisting essentially of carbon monoxide, methanol, oxygen, hydrogen and highly unsaturated hydrocarbons from olefines, especially from ethylene and propylene, by passing said olefines, in the gaseous phase and at elevated temperature, over a mass containing about 20–60% by weight of cupric oxide (CuO) and capable of being regenerated by treating it with an oxygen-containing gas, the said process being characterized in that in addition to cupric oxide, the said mass contains zinc oxide (ZnO).

2. Process according to claim 1, characterized in that the purification is effected at a temperature of 50–200° C.

3. Process according to claims 1 and 2, characterized in that the purification is effected at a temperature of 100–150° C.

4. Process according to claim 1, characterized in that the purification is effected at a pressure ranging from atmospheric to 50 bars.

5. Process according to claim 1, characterized in that the oxygen-containing gas contains a small amount of water in the vapour form.

6. Process according to claim 1, characterized in that the oxygen-containing gas contains 0.05–1% by weight of water.

References Cited

UNITED STATES PATENTS

| | | | |
|---|---|---|---|
| 2,370,809 | 3/1945 | Morrell et al. | 260—677 |
| 2,548,619 | 4/1951 | Ray | 260—677 |
| 3,068,304 | 12/1962 | Spector | 260—677 |
| 2,381,707 | 8/1945 | Wood et al. | 260—677 |
| 3,202,727 | 8/1965 | Dancer et al. | 260—681.5 |
| 3,076,858 | 2/1963 | Frevel et al. | 260—677 |

FOREIGN PATENTS

| | | | |
|---|---|---|---|
| 555,588 | 8/1943 | Great Britain | 260—677 |
| 119,278 | 12/1944 | Australia | 260—677 |

DELBERT E. GANTZ, Primary Examiner

J. M. NELSON, Assistant Examiner